United States Patent [19]

Truninger

[11] 4,445,588

[45] May 1, 1984

[54] GUIDABLE BOGIE TRUCK FOR MOBILE CRANES

[75] Inventor: Thomas Truninger, Zurich, Switzerland

[73] Assignee: Adna AG, Vaduz, Liechtenstein

[21] Appl. No.: 385,118

[22] Filed: Jun. 4, 1982

[51] Int. Cl.³ ........................ B60K 17/14; B60K 41/28

[52] U.S. Cl. .................................... 180/233; 180/242; 180/333; 212/189; 280/763.1

[58] Field of Search ............... 180/233, 199, 242, 244, 180/252, 333; 280/763.1; 212/189

[56] References Cited

U.S. PATENT DOCUMENTS

| | | | |
|---|---|---|---|
| 2,752,056 | 6/1956 | Lull | 212/189 |
| 3,029,886 | 4/1962 | Hansen | 180/233 |
| 3,186,686 | 6/1965 | Mayer | 180/199 |
| 3,276,603 | 10/1966 | Noller | 212/189 |

FOREIGN PATENT DOCUMENTS

| | | | |
|---|---|---|---|
| 479680 | 11/1975 | U.S.S.R. | 180/189 |

*Primary Examiner*—Joseph F. Peters, Jr.
*Assistant Examiner*—Donn McGiehan
*Attorney, Agent, or Firm*—Watson, Cole, Grindle & Watson

[57] ABSTRACT

A guidable bogie truck for a mobile crane, such as a mobile gantry crane, includes a frame having longitudinal supports; a pair of wheel mechanisms connected to one end of the frame and a pair of wheel mechanisms connected to the opposite end of the frame, one of the pairs of wheel mechanisms being connected to pivotable axles which allows the associated pair of wheel mechanisms to constitute guide wheel mechanisms; four support legs movably connected to the frame; lifting devices connected to each of the four support legs to extend them downwardly to contact the ground and support the frame or to retract them upwardly towards the frame; wheel drive motors for turning the wheel mechanisms; adjustment motors for pivoting the pivotable wheel axles; and a common control device for controlling the operation of the bogie truck parts. A control panel on the bogie truck includes a shift lever and direction-setting parts which are connected to the common control device to allow the operator to suitably determine the operation of the common control device and thus the bogie truck.

11 Claims, 11 Drawing Figures

Fig. 1
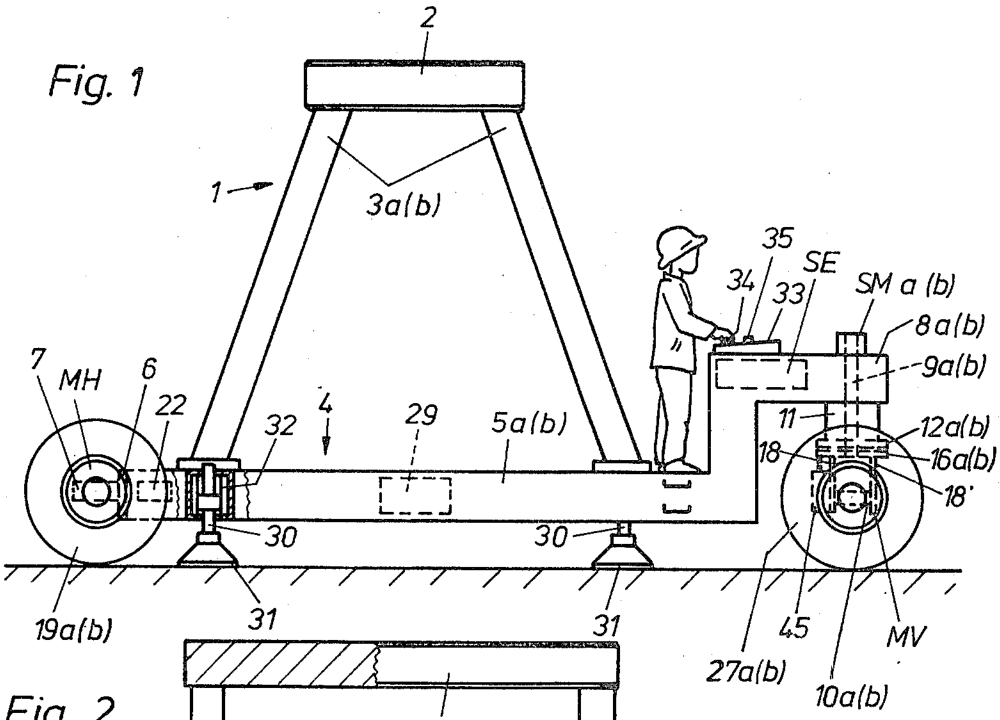
Fig. 2
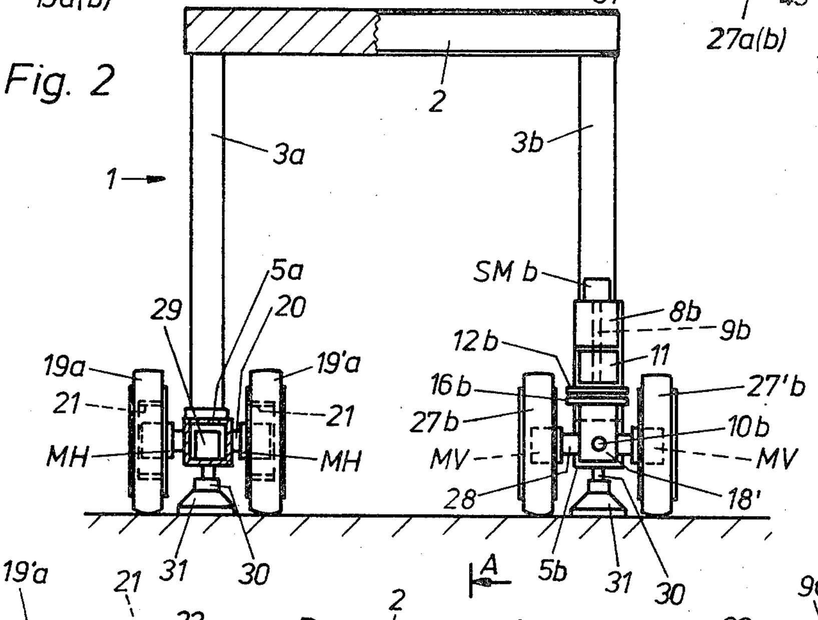
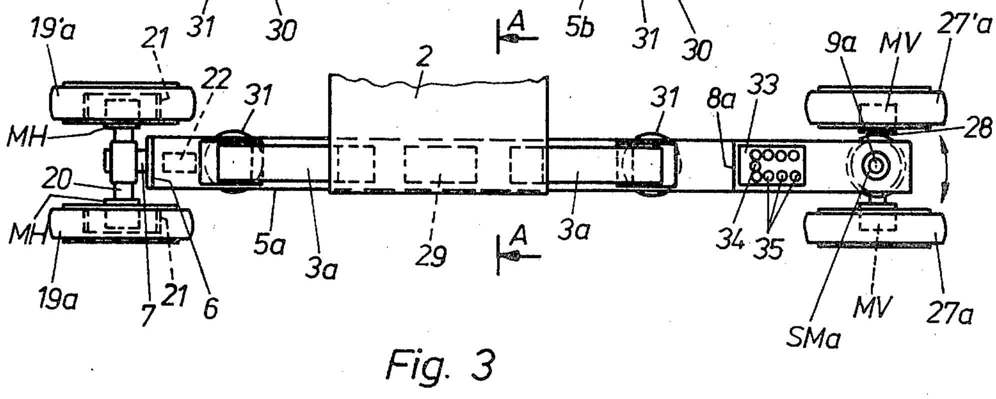
Fig. 3

Fig. 4
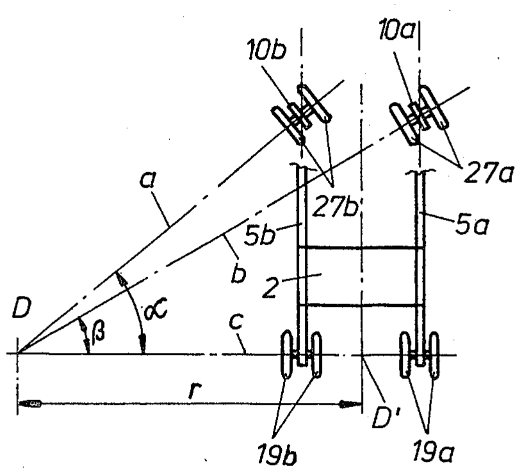
Fig. 6
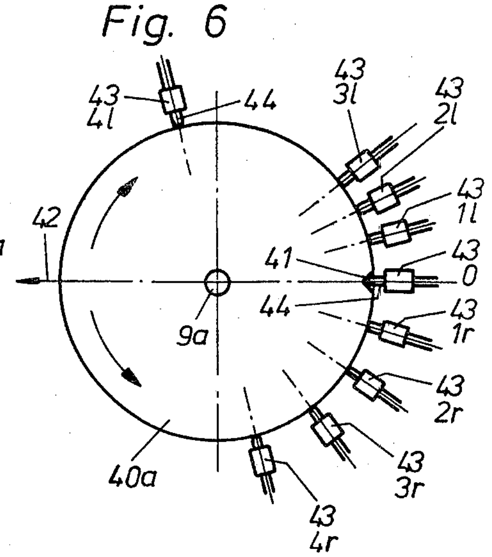
Fig. 7
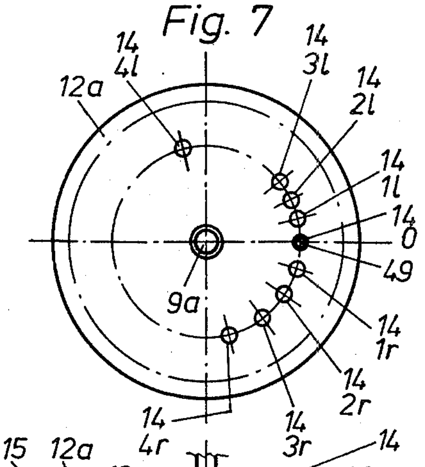
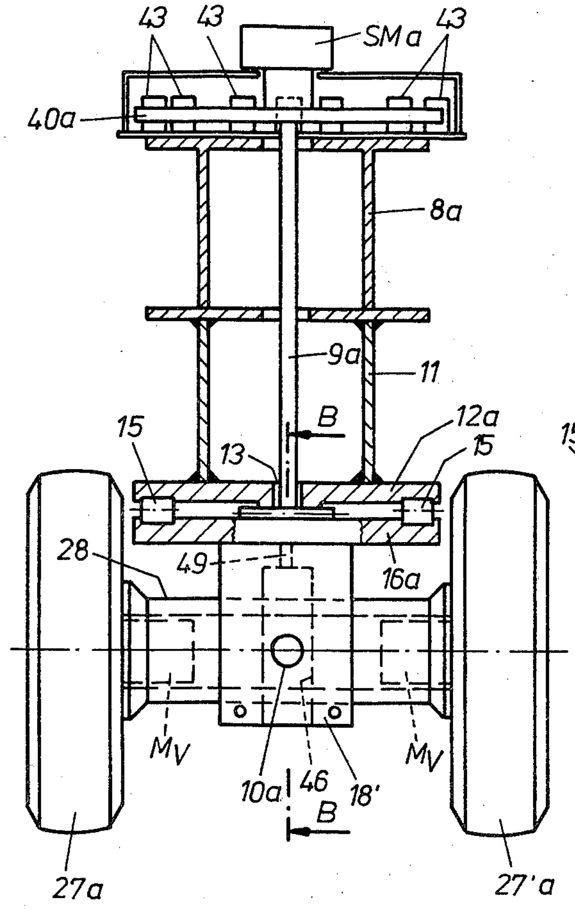
Fig. 5
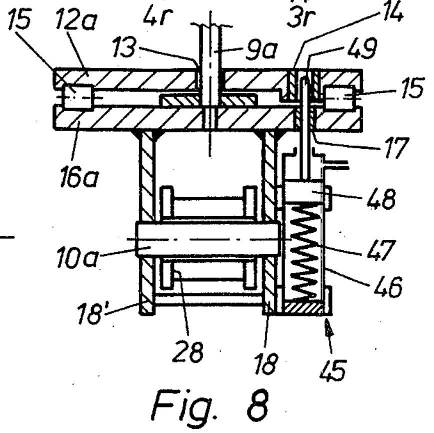
Fig. 8

GUIDABLE BOGIE TRUCK FOR MOBILE CRANES

BACKGROUND OF THE INVENTION

1. Field of the Invention

The present invention relates to a guidable bogie truck, and especially a guidable bogie truck which can support a mobile crane.

2. The Prior Art

Large and heavy gantry cranes, which are, for example, used to load and unload goods from ships in harbors, are frequently constructed to move along guide rails on the ground to enable them to be moved from one work site to another by operators who have little experience. However, because the guide rails will be fixed in position, these gantry cranes are limited as to the different sites to which they can be moved, and in addition the guide rail systems are in and of themselves expensive and time consuming to construct and maintain. On the other hand, although mobile gantry cranes which can move independently of guide rails will have a much greater versatility, the opportunities for accidents and/or damage to the crane structures is very great, and only very experienced operators can be used to control their movements.

At the same time, however, at many locations (especially in underdeveloped countries) the availability of experienced operators may be very limited and the terrain around the freight loading and unloading sites may be in bad condition. Thus mobile gantry cranes which are movable independently of guide rail systems, and which would be of the needed size, although economically advantageous to use, cannot be employed.

It is an object of the present invention to provide a guidable bogie truck for mobile cranes, especially mobile gantry cranes, which can be easily operated by unskilled (although necessarily conscientious) operators, such that the mobile cranes can be successfully used even at sites which may be in bad condition.

SUMMARY OF THE INVENTION

According to the present invention, the guidable bogie truck includes a frame; two pairs of wheel means, one pair being connected to the front end of the frame and the other pair to its back end, the pair of wheel means on at least one of its ends being connected to pivotable wheel axles which can pivot to guide the bogie truck; four support legs, each support leg being movably connected to the frame near a respective wheel means and each including a footplate for contact with the ground; lifting devices connected to each of the support legs to extend the associated support leg towards the ground or retract it upwardly towards the frame; at least one adjustment motor to cause the pivotable wheel axles to pivot; at least one wheel drive mechanism to turn at least one pair of wheel means; and a common control device for controlling the operation of the essential bogie truck parts.

The advantages obtainable with the invention are in particular the fact that only direction-setting parts need be actuated when the bogie truck is stopped, and that all steps thereafter required occur automatically.

The invention will now be better understood by reference to the accompanying drawings taken in conjunction with the following discussion.

DESCRIPTION OF THE DRAWINGS

FIG. 1 shows a schematic side view of a guidable bogie truck constructed in accordance with one embodiment of the present invention, the bogie truck having two longitudinal supports, FIG. 2 shows a schematic front view of the bogie truck of FIG. 1, FIG. 3 shows a schematic top view of one of the longitudinal supports, FIG. 4 depicts a wheel setting for turning the bogie truck through an arc, FIG. 5 shows a pivotable wheel pair of the bogie truck showing the setting and stopping devices, FIG. 6 shows a top view of a part of the setting device associated with the pivotable wheel pair of FIG. 5, FIG. 7 shows a top view of a part of the stop device associated with the pivotable wheel pair of FIG. 5, FIG. 8 shows a section through another part of the same device.

DETAILED DESCRIPTION OF THE PREFERRED EMBODIMENT

Figure 9:
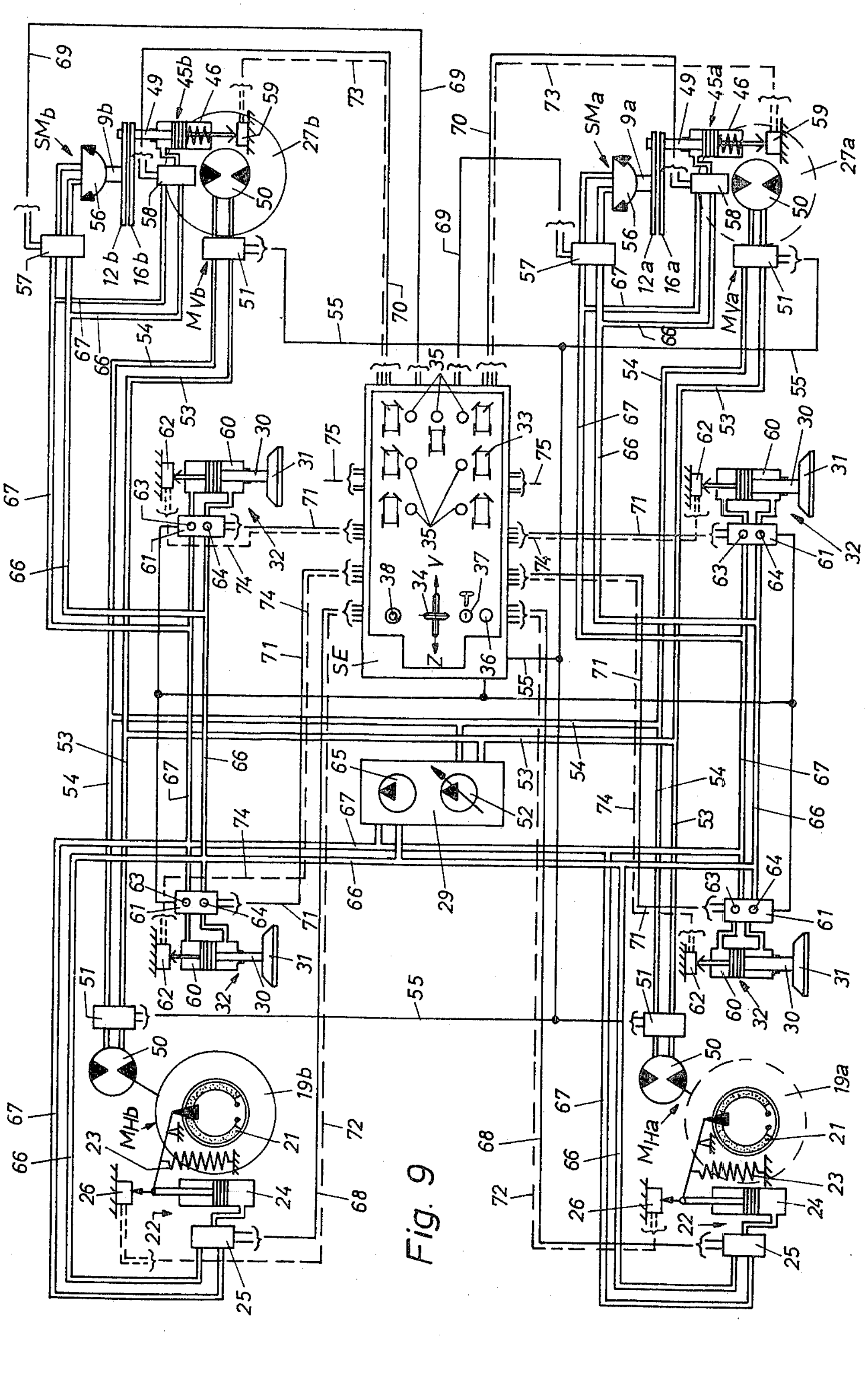
FIG. 9 shows the oil circulation system and control circuits of the bogie truck.

One embodiment of a guidable bogie truck for a mobile gantry crane according to the present invention is schematically shown in FIGS. 1 and 2, FIG. 1 showing a side view and FIG. 2 showing a front view. The gantry crane 1, which includes a platform 2 resting on two pairs of legs **3*a*, 3*b* for the operative crane structure (not shown), is mounted on two identical and parallel longitudinal supports 5*a*, 5*b* of a rigid bogie truck frame 4. The end parts of the longitudinal supports 5*a*, 5*b* extend beyond both of the corresponding sides of portal 1. FIG. 3 shows a top view of one of the longitudinal supports 5a**.

Both of the longitudinal supports **5*a*, 5*b* are constructed as solid-wall box girders and thus are very strong. As indicated in FIG. 5, they may, for example, be formed of fixed I beams. Corresponding first ends of the longitudinal supports 5*a*, 5*b* are closed by massive closure plates 6 which are each formed to include a horizontal, rigid wheel axle 7 so as to extend in the longitudinal direction of the associated support, whereas the second ends of the longitudinal supports connect to upwardly extending swan-neck pieces 8*a*, 8*b* located beyond the end of the portal 1. These swan-neck pieces are constructed in the same manner as the longitudinal supports themselves, and each carries a respective rotatable, vertical axle 9*a*, 9*b*. Each axle is respectively coupled to a servomotor SMa, SMb at its upper, free end and to a horizontal pivotable wheel axle 10*a*, 10*b*** at its lower end.

Each of the two horizontal, rigid wheel axles 7 and the two horizontal, pivotable wheel axles **10*a*, 10*b* form respective wheel pairs 19*a*, 19*b* and 27*a*, 27*b* on wheel suspensions in the embodiment shown in FIGS. 1 to 3. The wheel suspensions are of a conventional type and preferably have respective independent axles 20, 28. Usually the bogie truck travels with the wheel pairs 27*a*, 27*b*, which are mounted on pivotable wheel axles 10*a*, 10*b*, functioning as front wheels and with the wheel pairs 19*a*, 19*b*, which are mounted on rigid wheel axles 7, functioning as rear wheels. The front wheel pairs 27*a*, 27*b*** are appropriately moved in order to guide (steer)

the bogie truck. In order to move pivotable wheel axles 10*a*, 10*b* with vertical axles 9*a*, 9*b*, a hollow cylindrical intermediary piece 11 is coaxially fastened, e.g. welded, to the respective vertical axles 9*a*, 9*b* on each longitudinal support 5*a*, 5*b* on the underside of swan-neck piece 8*a*, 8*b*. This intermediary piece 11 carries respective concentric, horizontal disks 12*a*, 12*b* permanently connected to it as a rigid bearing part for respective rotary concentric disks 16*a*, 16*b* located thereunder. The two rotary disks are permanently connected to vertical axles 9*a*, 9*b* and each one has a pair of pillow blocks 18, 18' on its underside in which pivotable wheel axles 10*a*, 10*b* are mounted.

An all-wheel drive with a wheel drive device $M_V$ for each front wheel 27 and a wheel drive device $M_H$ for each rear wheel 19 is provided in the bogie truck shown in FIGS. 1 to 3. The wheel drive devices $M_V$, $M_H$ are preferably hydraulic devices which are associated with a common pump aggregate 29, as is well-known in the drive art.

Brake devices 21, indicated by dotted lines in FIGS. 2 and 3, are associated with rear wheels 19, 19' located on rigid wheel axles 7 of longitudinal supports 5*a*, 5*b*. Brake devices 21 are constructed so that they block rear wheels 19, 19' when at rest and can only be released by a power producer 22. Power producers 22 are likewise preferably hydraulic devices.

The two longitudinal supports 5*a*, 5*b* are provided with conventional support legs 30 which are positioned on the longitudinal supports 5*a*, 5*b* near the joining points of portal legs 3*a*, 3*b*. These support legs 30 can be extended and retracted by means of individual lifting devices 32. Both the support legs 30, which are equipped with footplates 31, and the associated lifting devices 32, which are preferably hydraulic, are positioned and arranged in such a way that when they are completely extended, wheels 19, 27 of the bogie truck are completely raised off of the ground.

A control panel 33 which is readily accessible to and easy to operate by the crane operator is located on the swan-neck piece 8*a* of the one longitudinal support 5*a*. The control panel 33 functions to guide the bogie truck. The shifting and setting parts of this control panel, as well as in particular a shifting part 34, which is preferably constructed as a guide lever for guiding wheel drive devices $M_V$, $M_H$ to a desired direction of travel and travel speed, and direction-setting parts 35 for selecting pivot positions for the pivotable wheel axles 10*a*, 10*b*, act on a guide device SE. As will be described in more detail later, guide device SE is set up so that when the shifting and setting parts of control panel 33 are actuated, even under difficult local conditions, a safe moving and setting-up of the bogie truck are assured by basically automatic guide processes for the power producer 22 of the brake devices 21 and for lifting devices 32 associated with the support legs 30, as well as for the devices for moving pivotable wheel axles 10*a*, 10*b*. The latter are treated in more detail in conjunction with FIGS. 4 to 8.

In order to execute a circular path, pivotable wheel axles 10*a*, 10*b* on the bogie truck must, as is known, be set so that the respective geometric axes of rotation a, b, c of the wheels is achieved. Wheel pairs of the bogie truck intersect each other approximately in the center of the circle (rotational point D) as is illustrated schematically in FIG. 4 for a left curve with curvature radius r to be traveled by the previously described bogie truck. When pivotable wheel axles 10*a*, 10*b* are set to follow a curve, the wheel pair on the inside of the curve should be set at an angle $\alpha$ which is greater than the adjustment angle $\beta$ of the wheel pair on the outside of the curve. Adjustment (setting) angles $\alpha$ and $\beta$ for pivotable wheel axles 10*a*, 10*b* can be calculated by a computer from the separations of the wheel pairs from each other (these separations are fixed for a given bogie truck); from any selected curve curvature radius r; from any pivot process selected, such as forward or reverse travel; and from whether rotary point D is on the side of the one longitudinal support 5*a*, on the side of the other longitudinal support 5*b*, or whether the bogie truck is to pivot in place about rotary point D' located in the middle between the rear wheel pairs 19, 19' on their common axis of rotation C. Pivotable wheel axles 10*a*, 10*b* can then be set appropriately by vertical axles 9*a*, 9*b* coupled to positioning motors SMa, SMb using the values calculated for adjustment angles $\alpha$ and $\beta$ as theoretical values for guiding adjustment motors SMa and SMb. When the bogie truck is guided in this manner, the driver should estimate the radius of curvature for each arc to be traveled, which would necessitate frequent connections in the case of an inexperienced crane operator, for which the bogie truck would have to be halted. Changes in place of a large and heavy gantry crane are usually executed very slowly, so that a considerable amount of time spent in traveling an arc is frequently acceptable, and the arc can be traveled, by linking together short, straight path sections. Only three settings are needed for such a mode of travel for each pivotable wheel axle 10*a*, 10*b*: straight ahead (0°) and stationary pivoting to the right and to the left (90° r and 90° l), and the control panel 33 (FIG. 3) could have only three correspondingly designated buttons as direction-setting parts 35 for entering the theoretical values for adjusting adjustment motors SMa and SMb into guide device SE. The crane operator need have no experience or practice for such an extremely simple operation, and any movement of the bogie truck can be accomplished without damage or accident, given sufficient caution and care.

The time needed for describing an arc can be shortened without placing great demands on the crane operator by providing a few intermediate positions for pivotable wheel axles 10*a*, 10*b* between the extreme positions of straight ahead (0°, curvature radius $\infty$) and stationary pivoting (90°, curvature radius equal to axial wheel interval on the longitudinal support), such as, for example, 15° for a large curvature radius, 30° for an average one and 45° for a small curvature radius. The curvature radii in relation to the length of the bogie truck are easy to estimate by the crane operator, and only slight corrections, if any, need be performed by pivoting in place when describing an arc after actuation of the appropriate direction-setting part 35. Such a setting device with a simple construction is schematically represented in FIGS. 5 and 6.

FIG. 5 shows a front view of the front wheels 27*a*, 27'*a* of a longitudinal support 5*a* and shows swan-neck piece 8*a*in section with hollow cylindrical intermediary piece 11, as well as disk 12*a* which is permanently connected to intermediary piece 11. Rotary disk 16*a*, which carries pillow blocks 18, 18' for the pivotable, horizontal wheel axle 10*a*, rests in an easily rotatable fashion on the underside of disk 12*a* over a crown of balls or rollers 15. The lower end of vertical axle 9*a* runs through a control opening 13 in disk 12*a* and is permanently connected to rotary disk 16*a*. Vertical axle 9*a*, coupled to adjustment motor SMa, carries a horizontal cam disk 40*a* on its upper end which, as FIG. 6 shows, is constructed as a complete circle with only one notch 41 or only one cam. When vertical axle 9*a* turns, cam disk 40*a* turns too, and the particular position of notch 41 in relation to a reference point on swan-neck piece 8*a* indicates the setting angle of pivotable wheel axle 10*a*. In FIG. 6 straight ahead travel is indicated by arrow 42, and the position of notch 41 shown there indicates that pivotable wheel axle 10*a* is in the 0° setting for traveling straight ahead. Addressible signal transmitters $43_o$, $43_{11}$–$43_{41}$ $43_{1r}$–$43_{4r}$ are permanently fixed around cam disk 40*a* on swan-neck piece 8*a* in the 0° position for straight-ahead travel and in the angular positions calculated for right and left arcs in relation to given nominal settings such as 15°, 30°, 45° and 90°. These signal transmitters scan cam disk 40*a*, e.g. with tappets 44, each of which emits an actual value signal if its tappet 44 senses notch 41 of cam disk 40*a*. The setting device on the other longitudinal support 5*b* is constructed in the same manner; however, the position angles for the signal transmitters for left arcing (turning) and right arcing are interchanged, since in the case of longitudinal support 5*b* the front wheel pair 27*b* is on the inside of the curve for a left turn (arc) and is on the outside for a right turn.

Individual direction-setting parts 35 are provided on control panel 33 for the provided settings of 0°, 15° . . . 90° for turning left and 15° . . . 90° for turning right. The signal transmitters 43 of the two setting devices associated with each direction-setting part 35 are selected over guide device SE by the actuated part 35. Guide device SE produces guide signals for the two adjustment motors SMa and SMb from the existing (fixed) actual value signal and the selection signal (theoretical value signal) obtained when a direction-setting part 35 is actuated, whereupon adjustment motors SMa and SMb turn in the proper direction of rotation until notch 41 of each cam disk 40*a*, 40*b* reaches the selected signal transmitter 43. Such a guiding of motors occurs frequently in the art, e.g., the guiding of elevators, so that many circuits, even simple ones, are known for this purpose, and the details of these circuits will not be discussed further.

When pivotable wheel axles 10*a*, 10*b* are adjusted, their wheels or wheel pairs 27*a*, 27*b* are always raised off the ground by the extension of at least the front support legs 30 on the longitudinal supports 5*a*, 5*b*. After pivotable wheel axles 10*a*, 10*b* have been set, vertical axles 9*a*, 9*b* are fixed so firmly in their particular rotated position that the setting is maintained even if the bogie truck runs against an obstacle.

FIGS. 7 and 8 show a preferred, simple stop device for front wheel pair 27*a* in FIG. 5. For stopping vertical axle 9*a*, disk 12*a*, which is fastened firmly to intermediary piece 11, and rotary disk 16 are connected together so that they cannot rotate by means of a vertical bolt 49 in the particular rotated position. In the stop device 45 shown, bolt 49 is the piston rod of a single-acting hydrocylinder 46, the piston 48 of which is pressed by spring 47 into the end position in which bolt 49 (the piston rod) is inserted in the particular rotated position of vertical axle 9*a* in mutually aligned boreholes 14 and 17 in disk 12*a* and in rotary disk 16*a*, thus firmly holding rotary disk 16*a* to the disk 12*a* which is firmly attached to intermediary piece 11. Hydrocylinder 46 can be fastened to intermediary piece 11 above disk 12*a* or, as is shown in the drawing, it can be located on one of the pillow blocks 18, 18' which carry pivotable wheel axle 10*a*. The disk near hydrocylinder 46 has a single borehole through which bolt 49 extends, and the disk further away from hydrocylinder 46 has a number of boreholes corresponding to the settings provided which are positioned in the same angular positions as the signal transmitters (FIG. 6) and into which bolt 49 engages in the particular rotated position. Thus, in the case of hydrocylinder 46 fastened to pillow block 18 rotary disk 16*a* has only one borehole 17 and disk 12*a*, which is fixed to intermediary piece 11 and is shown in a top view in FIG. 7, has boreholes $14_o$, $14_{11}$–$14_{41}$, $14_{1r}$–$14_{4r}$ corresponding to the provided settings for straight ahead, left turn and right turn.

The schematic diagram in FIG. 9 shows the hydraulic devices of the bogie truck with their oil circulation systems and the control circuits affected by the shifting and setting parts of control panel 33.

Wheel drive devices $M_{Va}$, $M_{Vb}$, $M_{Ha}$, $M_{Hb}$ for the front and rear wheels or wheel pairs 27*a*, 27*b*, 19*a*, 19*b* are hydromotors 50 which are equipped with, e.g., electro-hydraulic directional control valves 51 as setting members. These hydromotors are supplied with oil under pressure from a regulatable hydropump 52 of pump aggregate 29, which is adjustable by means of control lever 34 on control panel 33, via pressure oil lines 53 and are connected to pump aggregate 29 via oil return lines 54. When control lever 34 is moved out of its neutral position in the one direction v for forward travel and in the other direction z for reverse travel, control signals are sent via signal lines 55 to directional control valves 51 which cause valves 51 to move out of their neutral center positions for turning hydromotors 50 in the one or the other direction of turn. Such hydraulic drive systems are conventional, so that further details are unnecessary.

The other hydraulic devices of the bogie truck, that is, the hydraulic pivot motors 56 with input-side electrohydraulic directional control valves 57, which motors are provided as adjusting motors SMa and SMb for moving vertical axles 9*a* and 9*b*; the single-acting hydrocylinders 46 with electro-hydraulic directional control valves 58, which cylinders are used in stop devices 45*a*, 45*b* for stopping vertical axles 9*a*, 9*b*; the double-acting hydrocylinders 60 with directional control valves 61 which function as lifting devices 32 for support legs 30; and the single-acting hydrocylinders 24 with electrohydraulic directional control valves, which are used as power producers 22 for releasing braking devices 21 which block rear wheels or wheel pairs 19*a*, 19*b* under the action of springs 23, are all connected to a separate oil circulation system in which they are supplied with oil under pressure from a constant pump 65 of pump aggregate 29 via pressure oil lines 66, and in which oil from the hydraulic devices is returned through oil return lines 67 back to pump aggregate 29.

Electro-hydraulic directional control valves 25 (of power producers 22 for braking devices 21), 57 (of adjusting motors SMa, SMb), 58 (of the stop devices 45*a*, 45*b*) and 61 (of the lifting devices 32 for support legs 30) are connected to guide device SE via control signal lines 68, 69, 70, 71 which are indicated in FIG. 9 by simple solid lines. Indicating signal transmitters are associated with power producers 22, stop devices 45*a*, 45*b* and lifting devices 32, are connected to control device SE by indicator signal lines shown in FIG. 9 in simple dotted lines and indicate the current operational states of the devices to the control device with appropriate signals. A limit switch, for example, actuated by the piston rod of hydrocylinder 24, is provided in each braking device 21 as a "blocking—indicating signal transmitter" 26. This limit switch indicates, via indicating signal line 72, to control device SE whether braking device 21 is set for blocking or for release. Likewise, in stop devices 45*a,* 45*b* the "stop-indicating signal transmitters" 59 can be limit switches actuated by bolts 49 (FIG. 8), which switches are connected via indicating signal lines 73 to control device SE and emit corresponding signals when vertical axles 9*a,* 9*b* are stopped or released. The "lift-indicating signal transmitters" 62 present in lifting devices 32 for support legs 30 are advantageously limit switch combinations, which are actuated by the piston rod of hydrocylinder 60 and/or, e.g., by footplate 31. These transmitters 62 emit indicating signals via indicating signal lines 74 to control device SE at least for a fully retracted support leg and for a fully extended support leg. Other signal lines 75 connect control device SE to the signal transmitters required for setting vertical axles 9*a,* 9*b* (FIGS. 5, 6), which transmitters are now shown in FIG. 9 for the sake of clarity.

All of the above-mentioned devices of the bogie truck are turned on by actuating main switch 37, which is on control panel 33 and is preferably a lock switch. However, control device SE is set up in such a manner that an actuation of control lever 34 and of direction-setting parts 35, which have symbols for the various wheel positions in FIG. 9 for the sake of differentiation, only becomes effective when a safety switch constructed as a key is actuated simultaneously with the other hand.

In order to orient the erected bogie truck into a horizontal position so as to obtain an even load, hand-actuated switching parts 63, 64 are associated with each directional control valve 61 of lifting devices 32 for support legs 30. Support legs 30 can be extended and retracted as desired with these switching parts independently of the control device SE. An actuation of these lifting-switching parts 63, 64 only becomes effective, however, when main switch 37 and a switching part 36 for lift release, both of which are on control panel 33, have been actuated.

Figure 10:
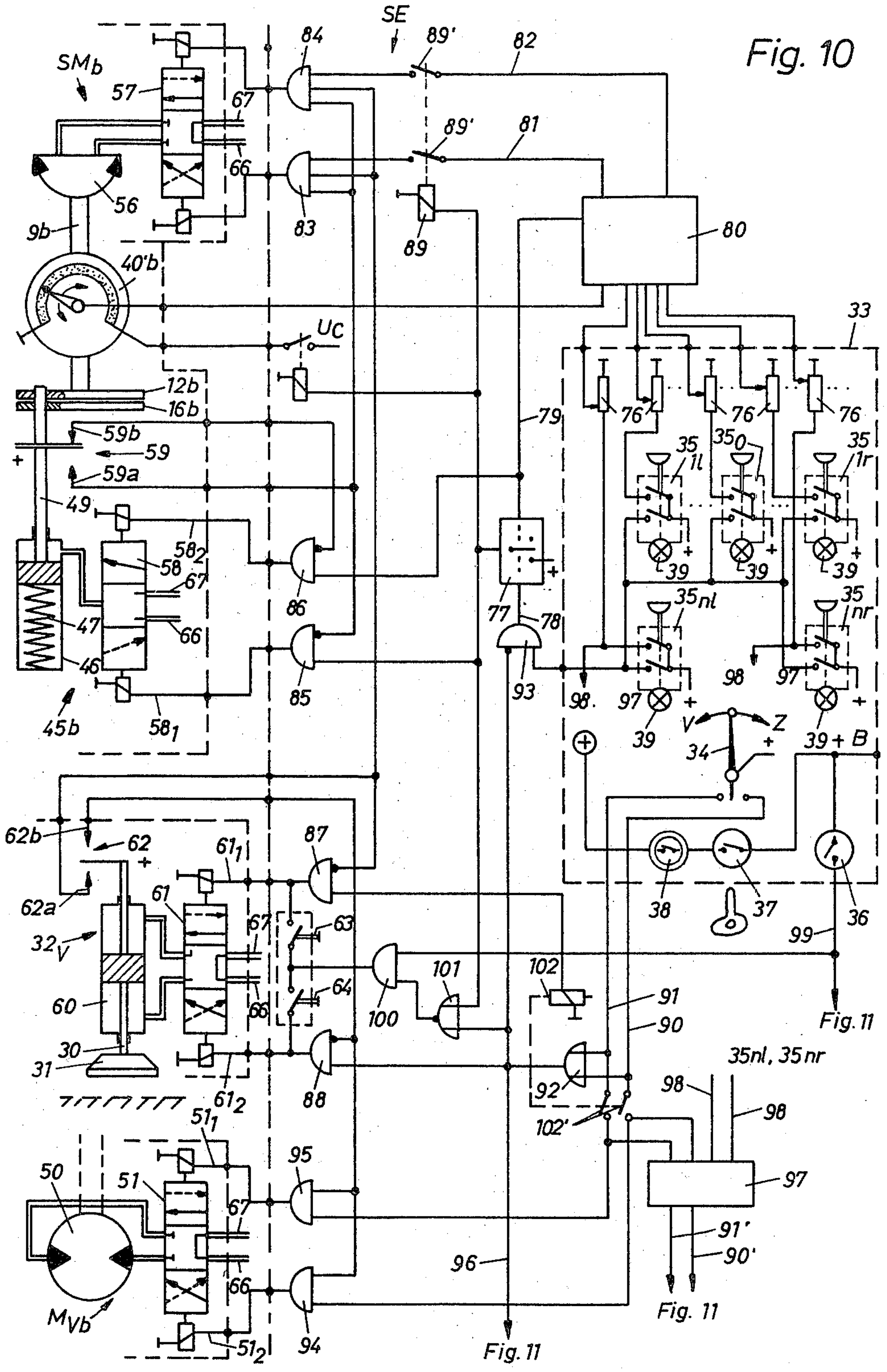
FIGS. 10 and 11 show a circuit system of the control device of the bogie truck.
Figure 11:
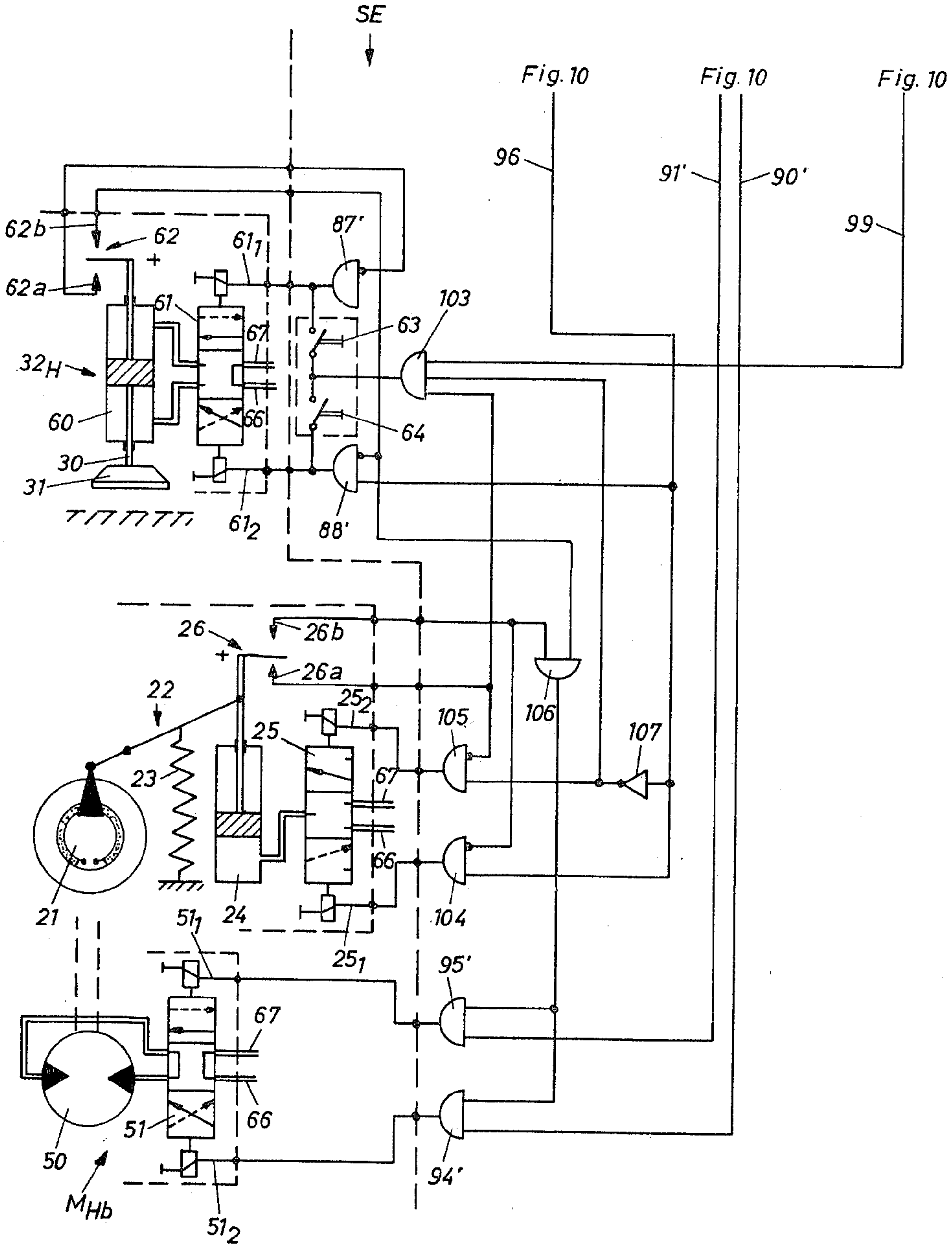

A logical electrical circuit for the one part of control device SE associated with the devices of the one longitudinal support 5*b* is shown in schematic fashion in FIGS. 10 and 11 in order to explain the control processes commenced with the actuation of switching part 34 for controlling wheel drive devices $M_{Va}$, $M_{Mb}$, $M_{Ha}$, $M_{Hb}$ and of direction-setting parts 35 for controlling adjusting motors SMa, SMb. The other part of control device SE associated with the devices of the other longitudinal support 5*a* is constructed correspondingly. Note, however, that only a few switching elements which are useful for illustrating the method of operation are entered in FIGS. 10 and 11, and that the circuit shown is in no way representative for a professional construction.

For adjusting vertical axle 9*b,* a theoretical value signal is entered into control device SE by actuating one of the direction setting parts $35_o$, $35_{1l}$. . . $35_{nl}$ and $35_{1r}$. . . $35_{nr}$ of control panel 33. This is illustrated in FIG. 10 by variable resistors 76 connected to direction-setting parts 35 and set at resistance values which are individual for them. Direction-setting parts 35 are preferably touch contacts, and when one of the direction-setting parts 35 is actuated in the circuit arrangement shown, an electronic switch 77 is cut in by a cut-in signal onto one of its input lines 78, over which switch voltage is put on signal transmitters 43 which are shown in FIGS. 5 and 6 and which scan cam disk 40, so that control device SE receives an actual value signal for the actual setting of vertical axle 9*b.* A potentiometer 40'*b* is shown in FIG. 10 instead of signal transmitters 43 and cam disk 40 for the sake of simplicity. Control device SE contains a comparator 80 which compares the entered theoretical value signal with the actual value signal and, depending on whether the entered theoretical value is greater or smaller than the actual value, emits a control signal onto one or the other of its two output lines 81, 82 connected to electro-hydraulic directional control valve 57 of pivot motor 56. This signal moves valve 57 out of neutral position into one or the other operating position, and pivot motor 56 begins to turn in the direction in question. In compensation, when the actual value is equal to the entered theoretical value, comparator 80 puts a cut-out signal on another input line 79 of electronic switch 77, which signal turns off (cuts out) switch 77.

Control device SE is set up in such a manner that the actuation of a direction-setting part 35 is only effective if at least the support legs 30 located near pivotable wheel axles 10*a,* 10*b* (FIGS. 103) have been placed into their extended position by means of their lifting devices 32, in which position guidable wheels or wheel pairs 27*a,* 27*b* are raised off the ground, and stop devices 45 (FIGS. 7, 8) have released a turning of vertical axles 9*a,* 9*b,* and, finally, no wheel drive device is engaged. For this purpose the two output lines 81 and 82 of comparator 80 in the circuit shown are each connected over an AND circuit 83 and 84 to directional control valve 57, each of which has a second input connected to the limit switch used as a stop-indicating signal transmitter 59 of stop device 45*b,* and (each of which has) a third input connected to the limit switch of lifting device 32 present as light-indicating signal transmitter 62. The second and the third inputs of the two AND circuits 83 and 84 receive L signals from indicating signal transmitters 59 and 62 when stop device 45*b* has been put out of operation and support leg 30 has been completely extended by lifting device 32.

In stop device 45*b* the two gate terminals $58_1$, $58_2$ of electro-hydraulic directional control valve 58 are each connected to an AND circuit 85, 86 with two inputs. The one AND circuit 85 receives an L signal on one input when electronic switch 77 is cut in, and it only receives an O signal on the other input from stopping signal transmitter 59 when the connection of disk 12*b* and rotary disk 16*b* by means of bolt 49 has been completely broken. When vertical axle 9*b* is stopped and electronic switch 77 is cut in, this AND circuit puts an L signal on gate terminal $58_1$ of directional control valve 58, which moves valve 58 out of its neutral position into the position which connects hydrocylinder 46 to the pressure oil line 66 and initiates the stopping by means of hydrocylinder 46. When the stopping has been completely released, the input of AND circuit 85 connected to stopping signal transmitter 59 (contact 59*a*) receives an O signal, whereupon directional control valve 58 returns to its neutral position. The other AND circuit 86 receives the cut-out signal emitted from comparator 80 during compensation to electronic switch 77 on one input as L signal and only receives an O signal on the other input from stopping signal transmitter 59 (contact 59*b*) if the connection of disk 12*b* and of rotary disk 16*b* by bolt 49 has been properly established. After the moving of vertical axle 9*b* has been accomplished and indicated by the cut-out signal emitted by comparator 80, AND circuit 86 puts an L signal on gate terminal 582 of directional control valve 58 which moves valve 58 out of its neutral position into the position which connects hydrocylinder 46 to the oil return line 67 and presses bolt 49 via spring 47 into the stop position. When the stopping of vertical axle 9*b* has been properly established, the input of AND circuit 86 connected to stopping signal transmitter 59 (contact 59*b*) receives an O signal and directional control valve 58 returns to its neutral position.

In the front lifting device $32_v$, each of the two gate terminals $61_1$ and $61_2$ of electro-hydraulic directional control valve 61 is connected to an AND circuit 87, 88 with two inputs. The one AND circuit 87 receives an L signal on one input when electronic switch 77 is cut in, and only receives an O signal on the other input from lift indicating signal transmitter 62 (contact 62*a*) if support leg 30 is completely extended. When electronic switch 77 is cut in and support leg 30 is not completely extended, this AND circuit 87 puts an L signal on gate terminal $61_1$ of directional control valve 61 which moves valve 61 from its neutral position into its work position, in which the connected hydrocylinder 60 is connected to pressure oil line 66 and to oil return line 67 for extending support leg 30. When support leg 30 is completely extended (contact 62*a*), the signal on the other input of AND circuit 87 changes from L to 0 and directional control valve 61 returns to its neutral position while support leg 30 remains extended.

L signals as control signals for electro-hydraulic directional control valves 51 of hydromotors 50 are put on signal control lines 90, 91 connected to control lever 34 for guiding wheel drive devices $M_v$ and $M_H$ when shift part 34, which is constructed as a shift lever, is moved out of neutral position o in direction v for forward travel and in direction z for reverse travel. An OR circuit 92 is connected to signal control lines 90, 91, which carry O signals when control lever 34 is in neutral. This OR circuit only emits an O signal as output signal at the neutral position of control lever 34, i.e., when wheel drive devices $M_V$, $M_H$ are turned off. The inverted output signal of OR circuit 92 is put on the one input of an AND circuit 93, the output of which is connected to the input line 78 of electronic switch 77, and the other input of which receives an L signal when one of direction-setting parts 35 is actuated, so that an actuation of parts 35 is only effective if no wheel drive device $M_V$, $M_H$ is turned on when O signals are on signal control lines 90, 91. As an additional safety measure in the circuit shown, make contacts 89' of a relay connected to electronic switch 77 are cut into output lines 81, 82 of comparator 80 running to directional control valve 57 of adjusting motor SMb and back contact 102' of the same or of a separate relay 102 connected to electronic switch 77 are cut into signal control lines 90 and 91, so that when electronic switch 77 is on, thus cutting in adjusting motor SMb, signal control lines 90, 91 are interrupted, and thus any actuation of shift part 34 for guiding wheel drive devices $M_V$, $M_H$ is ineffective, and after vertical axle 9*b* has been moved when electronic switch 77 is off, output lines 81, 82 of the comparator are interrupted and adjusting motor SMb is thus securely turned off, but a moving of shift part 34 for controlling the wheel drive devices via signal lines 90, 91 which are then closed can become effective.

In the pivotable wheel pair electro-hydraulic directional control valve 51 of wheel drive device $M_{Vb}$ is connected via AND circuits 94, 95 to signal control lines 90, 91, so that valve 51 is moved in correspondence with the moving of shift part 34 for controlling the wheel drive devices. For controlling the wheel drive device $M_{Hb}$ (FIG. 11) of the non-pivotable wheel pair 19*b*, control signal lines 90, 91 run over a change-speed mechanism 97 which is connected over lines 98 to direction-setting parts $35_{nl}$ and $35_{nr}$ for the 90° position, that is, for pivoting the bogie truck in place, and which is constructed so that control signal lines 90', 91' from change-speed mechanism 97 are usually connected to signal control lines 90, 91 and carry the same control signals as they do after actuation of a direction-setting part $35_{nl}$, $35_{nr}$. However, outgoing signal control lines 90', 91' are separate from signal control lines 90, 91 and carry O signals, so that wheel drive device $M_{Hb}$ is turned off during pivoting in place and the non-pivotable wheel pair corotates freely. Or, outgoing signal control lines 90', 91' for the particular direction of pivoting selected are connected to signal control lines 90, 91 in such a manner that the non-pivotable wheel pair is driven in the proper direction of rotation.

Furthermore, an actuation of shift part 34 for controlling wheel drive device $M_V$, $M_H$ is only effective if all support legs 30 have been brought by lifting devices 32 into a completely retracted position in which the wheels rest securely on the ground.

In wheel drive device $M_{Mb}$ the two inputs of AND circuits 94, 95 connected to directional control valve 51 are connected together with lift-indicating signal transmitter 62 of the associated lifting device $32_V$ and only receive an L signal from it (contact 62*b*) if support leg 30 is completely retracted, so that control signals supplied over signal control lines 90, 91 for moving directional control valve 51 are passed on from AND circuits 94, 95 to valve 51 only in this lifting state. In lifting device $32_V$ the AND circuit 88 belonging to gate terminal $61_2$ of directional control valve 61 is located on one input with the output signal of OR circuit 92. The other input of AND circuit 88 is connected to lift-indicating signal transmitter 62 of lifting device $32_V$ and only receives an O signal from it if support leg 30 is completely retracted. If the shift lever used as a shifting means 34 is moved out of its neutral position when support leg 30 is not completely retracted, an L signal from AND circuit 88 is put on gate terminal $61_2$ of directional control valve 61, which places valve 61 from the neutral position into the work position, in which hydrocylinder 60 is connected to oil pressure and return lines 66 and 67 for moving the support leg up, and leg 30 is retracted. When the leg is retracted into the final position, lift-indicating signal transmitter 62 puts an O signal (inverted signal from contact 62*b*) on AND circuit 88 which causes directional control valve 61 to be placed back into the neutral position, whereby, however, support leg 30 remains in the completely retracted position.

Wheel drive devices $M_H$ of the non-pivotable wheels can only be turned on by moving shift part 34 out of the neutral position o if support legs 30 are completely retracted and if, in addition, the blocking by brake devices 21 has been cancelled. As is shown in FIG. 11 for wheel drive device $M_{Hb}$, in the AND circuits 94' and 95' of directional control valve 51 the one inputs are connected to signal control lines 90', 91' and the other inputs are connected together to the output of AND circuit 106, the one output of which is connected to lift-indicating device 62 of lifting device 32 for the associated support leg 30 and only receives an L signal from lift-indicating signal transmitter 62 is support leg 30 is completely retracted, and the other input of which is connected to blocking indicating signal transmitter 26 of brake device 21 and only receives an L signal from signal transmitter 26 if the blocking has been properly released (contact 26*b*). If support leg 30 is not completely retracted and/or if the blocking has not been properly released, an O output signal of AND circuit 106 blocks the two AND circuits 94' and 95' and control signals on signal control lines 90', 91' are ineffective.

The one control input $25_1$ of electro-hydraulic valve 25 for single-acting hydrocylinder 24, which is used as power producer 22 for releasing the blocking counter to the action of spring 23, receives the output signal of AND circuit 104 as a control signal, the one input of which is connected over line 96 to the output of OR circuit 92, which detects the signals of signal control lines 90, 91 (FIG. 10). The other input of AND circuit 104 is connected to blocking indicating signal transmitter 26 and carries an O signal only when the blocking has been properly released. In the other AND circuit 105 belonging to the other control input $25_2$ of directional control valve 25 the one input is connected over inverter 107 to line 96, and the other input, connected to blocking indicating signal transmitter 26, carries an O signal only when the blocking is complete. When shift part 34 for controlling the wheel drive devices is moved out of its neutral position, AND circuit 105 blocks, and AND circuit 104 receives an L signal on its one input, so that it puts a positioning signal on gate terminal $25_1$ if the brakes block or are not properly released (inverted signal from contact 26*b*), and hydrocylinder 24 is connected to pressure oil line 66. Then, if the blocking is properly released, AND circuit blocks and directional control valve 25 is set back into its neutral position, whereby, however, the brakes stay released. If shift part 34 is then set back into its neutral position, AND circuit puts a positioning signal on control input $25_2$, by means of which hydrocylinder 24 is connected over directional control valve 25 to oil return line 67, so that spring 23 brings the brake device into blocking position, and when a proper blocking has been achieved, AND circuit blocks and directional control valve 25 returns to its neutral position.

In lift device $32_H$ control input $61_2$, over which directional control valve 61 is placed into work position for retracting support leg 30 by hydrocylinder 60, receives positioning signals from AND circuit 88', in which, as in AND circuit 88 if lift device $32_V$, the one input is connected to the output of OR circuit 92 and the other input is connected to lift indicating signal transmitter 62 (contact 62*b*). An AND circuit 87' can be present for the other control input $61_1$, even though the extending of rear support leg 30 should occur automatically, as, for example, during the moving of vertical axle 96. The inputs of AND circuit 87' are then connected just as the inputs of AND circuit 87 in lift device $32_V$.

As was already mentioned, directional control valves 61 of lift devices $32_V$, $32_H$ are associated with hand-actuated lift-switch parts 63, 64 with positioning signals which can be supplied to control inputs $61_1$ and $61_2$ for extending and retracting the support legs as desired. In the front lift device $32_V$ the lift-switch parts 63, 64 are only active when switch part 36 for lift release on control panel 33 is actuated and adjusting motor $SM_b$ as well as wheel drive device $M_{Vb}$ (FIG. 10) are turned off. A NOR circuit 101, the one input of which is connected to electronic switch 77 and the other input of which is connected to the output of OR circuit 92, only puts an L signal on the input of an AND circuit 100 if electronic switch 77 is cut out, i.e., no direction-setting part 35 is actuated, and signal control lines 90,91 are carrying O signals with shift part 34 set at its neutral position and adjusting motor $SM_b$ and wheel drive device $M_{Vb}$ are therewith turned off. The other input of AND circuit 100 is connected to switch part 36 for lift release and receives an L signal when it is actuated. The output of AND circuit 100 is connected over lift-switch parts 63 and 64 to control inputs $61_1$ and $61_2$ of directional control valve 61, and an L signal on the output of AND circuit 100 can be put on control input $61_1$ or $62_2$ by actuating one or the other lift-switch part 63 or 64. In the rear lift device $32_H$ (FIG. 11) each lift-switch part 63, 64 is connected to the output of an AND circuit 103 with three inputs, the one input of which is connected over line 99 to switch part 36 for the lift release, the second input of which is connected to the output of inverter 107 connected to OR circuit 92, and the third output of which is connected to blocking indicating signal transmitter 26 for receiving an L signal when the wheels are blocked (contact 26*a*), so that an actuation of lift-switch parts 63, 64 is only effective if switch part 36 is actuated, wheel drive device $M_{Hb}$ is turned off and brake device 21 is in blocking position. Since brake device 21 is automatically brought into blocking position when wheel drive device $M_{Hb}$ is turned off, AND circuit 103 actually needs only two inputs; however, the third input connected to blocking indicating signal transmitter 26 constitutes an additional check for the proper functioning of the control device.

As is customary in control devices, signal devices which are preferably optical are associated with at least a part of the switch parts to indicate their switch state. Thus, optical signal devices 39 for the individual direction-setting parts 35 are provided on control panel 33, for example, which indicate the particular actual position of the pivotable wheel axle in one color, e.g. green, and the new position selected in another color, e.g. red, until the pivotable wheel axle has reached the new position.

In order to show that when main switch 37 (FIG. 10) is cut in, an actuation of switch parts is only effective if safety switch 38 is actuated at the same time, these two switches 37, 38 are shown connected in series to the plus pole of a battery B which supplies the operating voltage for the control device, so that operating voltage is available for the individual control circuits of the control device only when switches 37, 38 are cut in. In practice, more suitable circuits are selected for this purpose, which are simple in construction and require no further explanation.

Commercially available logical modules can be used to control the individual directional control valves, so that the entire control device can be composed essentially of such modules. Other, especially electrical devices, can of course be used instead of the hydraulic devices. Thus, especially the relatively low-performance hydraulic devices like, for example, the pivot motors, the stop devices and the power producers can be replaced by corresponding electrical devices.

Although one embodiment of the invention has been now disclosed in detail, it should be appreciated that various changes thereto can be made and still fall within the scope of the appended claims.

I claim:

1. A guidable bogie truck for use with a mobile crane, said guidable bogie truck comprising a frame; two pairs of wheel means, one pair being connected to one end of the frame and the second pair being connected to the opposite end of the frame, one of said two pairs of wheel means being respectively connected to pivotable wheel axles so as to enable this pair of wheel means to constitute guide wheel means; four support legs movably connected to the frame, each support leg being attached to the frame near a respective wheel means and each support leg including a footplate; lifting means connected to each of said four support legs so as to extend them towards the ground and enable their associated footplates to contact the ground or retract them upwardly towards the frame; at least one wheel drive means for turning said wheel means; at least one adjustment motor means connected to said pivotable wheel axles to cause them to pivot and thus the associated guide wheel means to turn, thereby steering the bogie truck; and a common control device to which each of said wheel drive means, each adjustment motor means and each lifting means is connected, said common control device including at least one shift element for controlling said wheel drive means and at least one direction-setting element for selecting the pivot position of said pivotable wheel axles, said common control device being constructed in such a manner that whenever the direction-setting element is actuated, it first guides at least the two support legs located nearest said pivotable wheel axles into an extended position by their associated lifting means such that the footplates thereof contact the ground and cause the guide wheels to be lifted away from the ground, then it causes said adjustment motor means to pivot said pivotable wheel axles such that the associated guide wheel means are aimed in the desired new direction of travel, and it then causes said adjustment motor means to discontinue operation.

2. A bogie truck as defined in claim 1 wherein said common control device is constructed such that whenever said shift element is actuated to control said wheel drive means, it first causes saidlifting means to retract each said support leg into a retracted position, and it thereafter causes said wheel drive means to rotate the associated wheel means to move the bogie truck in the direction selected.

3. A bogie truck as defined in claim 1 wherein common control device is constructed such that said direction-setting element for selecting the position of the pivotable wheel axles is ineffective as long as said wheel drive means is activated, and said shift element for the wheel drive means is ineffective as long as said adjustment motor means for pivoting said pivotable wheel axles is activated.

4. A bogie truck as defined in claim 1 wherein separate said adjustment motor means are connected to each said pivotable wheel axle, and wherein said common control device is constructed such that said pivotable wheel axles are guided into the position wherein the geometric axes of rotation of all the wheel axles of the bogie truck intersect at approximately the same point.

5. A bogie truck as defined in claim 1 wherein separate said wheel drive means are associated with said guide wheel means.

6. A bogie truck as defined in claim 1 wherein said common control device includes switching parts for independently causing said lifting means to extend the associated support legs into engagement with the ground, and wherein said common control device is furthermore constructed such that said switching parts are inoperative as long as said wheel drive means or said adjustment motor means are operating.

7. A bogie truck as defined in claim 1 wherein each of said wheel drive means, said adjustment motor means and said lifting means are hydraulic mechanisms, and wherein said common control device includes a logical electrical circuit which control is electrically - actuatable valves which are located in the hydraulic mechanisms.

8. A bogie truck as defined in claim 1 wherein each of said pivotable wheel axles is connected to the frame via connection to the lower end of a respective rotatable vertical axle, the upper end of each rotatable vertical axle being connected to a respective adjustment motor means, and each vertical axle is associated with a stop device which can be activated or inactivated to hold the associated rotatable vertical axle in a particular rotary position, said stop devices being connected to said common control device, said common control device being constructed such that when said direction-setting element is activated, it first releases said stop devices and thereafter activates the associated adjustment motor means.

9. A bogie truck as defined in claim 8 wherein said wheel means pair not connected to said pivotable wheel axles are each associated with a brake device, each brake device including means to block rotation of the associated wheel means, at least one spring for actuating the block means, and a power producer for opposing the action of the spring to thereby unblock rotation of the associated wheel means, each power producer being connected to said common control device, and said common control device being constructed such that when said shift element is activated, it first causes said power producers to cause the brake devices to unblock rotation of the associated wheel means, it thereafter causes said wheel drive means to activate; and when said shift element is disengaged, it causes said wheel drive means to cease functioning, and it thereafter causes said power producers to allow the springs in each said brake device to cause the associated block means to block rotation of the associated wheel means.

10. A bogie truck as defined in claim 9 wherein said stop devices and said power producers are also hydraulic mechanisms which include associated electrically-actuatable valves, and wherein said logical electrical circuit of said common control device control the operation of said associated electrically-actuatable valves.

11. A bogie truck as defined in claim 1 wherein each wheel means comprises a set of two wheels.

* * * * *